(12) United States Patent
Hull

(10) Patent No.: US 7,566,195 B2
(45) Date of Patent: Jul. 28, 2009

(54) BLIND RIVET

(75) Inventor: Darren Hull, West Midlands (GB)

(73) Assignee: Newfrey LLC, Newark, DE (US)

( * ) Notice: Subject to any disclaimer, the term of this patent is extended or adjusted under 35 U.S.C. 154(b) by 351 days.

(21) Appl. No.: 11/449,791

(22) Filed: Jun. 8, 2006

(65) Prior Publication Data

US 2007/0009338 A1    Jan. 11, 2007

(30) Foreign Application Priority Data

Jun. 10, 2005    (GB) .................................. 0511793.2

(51) Int. Cl.
*F16B 13/04*    (2006.01)
(52) U.S. Cl. .......................................... 411/43; 411/38
(58) Field of Classification Search .................. 411/15, 411/21, 34, 38, 42, 501, 43, 969
See application file for complete search history.

(56) References Cited

U.S. PATENT DOCUMENTS

| | | | | |
|---|---|---|---|---|
| 3,667,340 A | * | 6/1972 | Black et al. ................... 411/38 |
| 3,685,391 A | | 8/1972 | Gapp et al. |
| 3,698,278 A | * | 10/1972 | Trembley ..................... 411/34 |
| 3,702,088 A | * | 11/1972 | Schmitt ........................ 411/44 |
| 4,263,834 A | * | 4/1981 | Dudash ........................ 411/44 |
| 4,639,174 A | | 1/1987 | Denham et al. |
| 4,826,372 A | | 5/1989 | Kendall |
| 4,897,003 A | * | 1/1990 | Bradley et al. ................ 411/43 |
| 4,909,687 A | * | 3/1990 | Bradley et al. ................ 411/43 |
| 5,131,107 A | * | 7/1992 | Pratt et al. ..................... 470/2 |
| 7,241,097 B2 | * | 7/2007 | Dembowsky et al. ........ 411/369 |
| 7,303,366 B2 | * | 12/2007 | Smith ........................... 411/43 |
| 2005/0123373 A1 | * | 6/2005 | Hufnagl et al. ............... 411/43 |

FOREIGN PATENT DOCUMENTS

| EP | 0595041 A2 | 5/1994 |
|---|---|---|
| EP | 0945631 A2 | 9/1999 |

* cited by examiner

*Primary Examiner*—Gary Estremsky
(74) *Attorney, Agent, or Firm*—Harness, Dickey & Pierce, P.L.C.

(57) ABSTRACT

A blind rivet assembly includes a mandrel having a male threaded portion at its distal end to be screwed into an internal female threaded portion of a rivet body. The mandrel has a section of enlarged diameter adjacent the male threaded portion joined by a breaker groove to a pulling portion. The section of enlarged diameter is accommodated within an internal bore of the collapsing portion of the rivet body, the collapsing portion having a radial groove on the outer surface thereof for improving the radial expansion of the rivet when installed. A shoulder in the internal bore supports a sealing ring. When assembled correctly, the pulling portion breaks off at the breaker groove.

8 Claims, 1 Drawing Sheet

Section A-A

BLIND RIVET

CROSS-REFERENCE TO RELATED APPLICATION

This application claims priority under 35 U.S.C. §119(a) of commonly assigned British Patent Application No. 0511793.2, filed Jun. 10, 2005. The disclosure of the above application is incorporated herein by reference.

BACKGROUND

The present invention relates to blind rivets, and more particularly, but not exclusively, to a blind rivet with high shear resistance.

A blind rivet assembly normally comprises a rivet body and a mandrel assembly. The rivet body comprises a flange portion and a cylindrical body that extends from the flange portion and an axial hollow bore that passes through the rivet body. A mandrel typically comprises a head portion and a long stem that passes through the rivet body, such that the mandrel head portion abuts a blind-side end of the rivet body.

In use, the rivet assembly is inserted into a prepared hole in a workpiece or application, so that the flange portion of the rivet body abuts an operator's side of the application. A workpiece or application typically consists of two, or more, sheets of material. In order to achieve setting a setting tool is attached to the blind rivet by sliding a nosepiece of the setting tool over the mandrel stem, such that the nosepiece of the setting tool abuts the flange of the rivet body.

On operation, jaws of the setting tool grip the mandrel stem and retract, such that a mandrel head portion applies an axial compressive load to one end of the rivet body. As the setting load increases, the rivet body experiences compressive loading. The compressive loading pulls the application parts together. The rivet body then deforms to fill the hole in the application. As the setting load increases further, the application parts are secured and the mandrel breaks at a predetermined breaking load. The setting is then complete.

The set rivet thus comprises a rivet body with its flange firmly abutted against the work piece; a radially expanded body on the blind-side and the residual mandrel head portion that remains in the rivet body. It can be seen that the mandrel is instrumental in providing the setting function in applying the rivet but it does not, however, contribute to the structural rigidity of the set rivet. For instance if the rivet were to be subjected to shear loads, for example two opposing forces in each sheet of the application at an angle to the longitudinal axis of the rivet, the rivet body will tend to tilt with its flange edge digging into one side of the application and the set-end into the opposite or blind side. Since the rivet is formed from a relatively softer material than the application, it tends to bend. If loading is cyclical there is a risk that the rivet body ultimately fails from fatigue induced stresses. In such instances a long break mandrel is usually specified. However, since such a long break mandrel also tilts, when subjected to shear forces, with the rivet body, (and as a result of its relatively smaller diameter), it does not contribute to the structural integrity or strength of the joint. This is a particularly acute problem where there is clearance between the mandrel shank diameter and the internal bore of the set rivet, as such a gap offers no resistive strength to a turning moment. This can be seen from published European Patent Application EP-A-0 945 631.

There are some assemblies, such as seats for passengers and drivers in automobiles, which are required to be securely anchored to an automobile frame and to be of rigid construction in order to resist impact and dynamic forces, that may be generated for example, during an accident.

A common method of seat construction uses blind rivets since they are low cost, easy to apply and contribute to the high productivity rates that are required by the automotive industry. Furthermore blind rivets are ideal where access to the blind-side or side remote from the assembly operator is difficult. This provides design flexibility and enables high production rates through semi or fully automated assembly.

With the ever increasing desire to improve rigidity and safety of seating construction, blind rivets or fasteners are required to be increasingly stronger, in particular in their shear resistance. One such method for improved strength is to make the rivet or fastener greater in diameter, as a greater amount of material provides improved strength and shear resistance and provides a greater bearing area to support applied loading.

The present invention seeks to provide an improved blind rivet which has improved strength and shear resistance.

A blind rivet body usually has a relatively thick wall section and is made from a relatively soft material, as the soft material is conducive to filling the hole in the application and forming a blind-side bulge on setting. Thick wall cylinders, however, formed from a relatively soft material such as a low-carbon steel, do not offer the optimum resistance to high shear stresses resulting from impact loads.

The present invention further seeks to provide a rivet with an improved shear resistance despite employing soft deformable materials in a blind rivet.

PRIOR ART

There are two problems that exist which require resolution. The first, as discussed, is to provide a large diameter blind rivet with a high resistance to shear loading that cannot be solved by just increasing or scaling-up the proportions of existing rivet designs. The second is to provide a rivet that can use existing manufacturing technology without resorting to large costly machines and tooling.

The present invention seeks to provide a solution to both these problems.

U.S. Pat. No. 4,826,372 proposes a blind rivet where the mandrel is permanently bonded to the deformable metal rivet on the blind side. Should the mandrel fail to detach, considerable remedial work is required to rectify the failure. The present invention seeks to provide a solution where, although sturdy when properly set, a blind rivet can, none the less, be readily repaired or removed from a hole should such a failure occur.

U.S. Pat. No. 3,685,391 teaches the use of a splayed mandrel to deform and expand the deformable rivet body. Just as with U.S. Pat. No. 4,826,372, there is a problem should the mandrel fail to snap off at the end of the blind riveting operation. The present invention seeks to provide an improvement over the teaching of U.S. Pat. No. 3,685,391 by providing a sturdy blind rivet which can, none the less, be readily repaired or removed from a hole should such a failure occur.

U.S. Pat. No. 4,639,174 teaches the use of a mandrel having a terminal head at the distal end of the deformable metal rivet. The terminal head pulls upon the deformable metal rivet as the mandrel is drawn from the work. U.S. Pat. No. 4,639,174 causes the same problem as U.S. Pat. Nos. 3,685,391 and 4,826,372. The present invention seeks to provide an improvement over the teaching of U.S. Pat. No. 4,639,174 by providing a sturdy blind rivet which can, none the less, be readily repaired or removed from a hole should such a failure occur.

An object of the present invention is to solve the foregoing problems and provide a blind rivet having high shear strength resistance.

SUMMARY OF THE INVENTION

According to a first aspect of the present invention there is provided a blind rivet assembly comprising: a rivet body having a flange and a bore, comprising a thin walled collapsing portion, and an internal female threaded portion; a mandrel having a male threaded portion, a pulling portion and a breaker groove; whereby, in use, the male threaded portion is screwed into the female threaded portion to permit the mandrel to pull the female threaded portion towards the flange thereby deforming the collapsing portion and, when the collapsing portion is collapsed, to permit breaking of the pulling portion, at the breaker groove.

The invention also provides a blind rivet assembly wherein the mandrel can further comprise a portion of enlarged diameter having a diameter greater than that of the male threaded portion, between the male threaded portion and the breaker groove, and wherein the rivet body can further comprise an internal bore to accommodate the portion of enlarged diameter.

The invention also provides a blind rivet assembly wherein the internal bore can further comprise a radial groove on the outer surface thereof to control and improve the radially outward extent of collapse of the collapsing portion.

Preferably the invention also provides a blind rivet assembly wherein the internal bore can comprise a shoulder between the internal bore and the internal female threaded portion, and where the assembly can further comprise a sealing ring, operative, when the male threaded portion is screwed into the internal female threaded portion, to provide a seal between the portion of enlarged diameter and the internal female threaded portion.

The invention also provides a blind rivet assembly wherein the shoulder can further comprise a reduced diameter for fixing the sealing ring at the shoulder.

The invention further provides a blind rivet assembly wherein the sealing ring can be one of: an "O" ring, a flat washer, and a mechanically dispensed or molded bead.

The invention further provides a blind rivet assembly wherein the pulling portion can be of smaller diameter than the portion of enlarged diameter, can comprise pulling grooves, and can comprise longitudinal splines.

The invention further provides a blind rivet assembly wherein the breaker groove can comprise tapering sides and a root, the root also being tapered inwardly in the direction of the male threaded portion.

The present invention thus provides a novel blind rivet utilising blind threaded insert technology. In particular it adopts the threaded insert as the rivet body to provide a large diameter fastener that is capable of resisting high applied shear loads. The present invention provides the added advantage that the parts for this blind fastener can be made by conventional production methods without the need for costly manufacturing machines and tooling usually associated with large diameter blind rivets.

The proposed invention describes a blind rivet that is essentially a threaded insert body or rivet body and a pulling mandrel that is attached by means of the thread. The rivet body is characterised by a flange, a collapsible portion and an internal thread. It is into this thread that a shouldered pulling mandrel with its pulling grooves and break groove is screwed and retained by an externally applied swaging operation. Provision is made for increasing the grip capability of the threaded insert that normally has only a small grip range. Also provided is an internal seal to prevent ingress of fluid or vapour through the internal bores of the fastener.

The present invention also provides a method of securing a mandrel to a threaded insert and using the mandrel as a pulling means in order to set the mandrel in the application. Earlier blind rivets have mandrels, usually of uniform diameter, which do not provide sufficient support against shear loads since there is a wide gap between the mandrel shank and internal wall of the rivet. An illustration of this gap can be seen in EP 0945631 FIGS. 6 and 7. The present invention, in contrast, provides a blind rivet where the collapsing bore of the threaded insert can be filled with a solid material that has a high shear resistance to shearing and therefore imparts substantial shear strength to the rivet. Thus the invention is characterised by a shouldered pulling mandrel to give support to the internal bore of the set rivet body.

Although blind threaded inserts that are used as fasteners are described in several patent applications the proposed invention that uses a threaded insert as a rivet body to clamp two parts of an application together and provide a rigid joint support is not known.

The closest prior art is shown in EP-A-0595041—Bollhoff & Co. EP-A-0595041 illustrates a variety of threaded inserts. EP-A-0945631—Emhart Inc. shows a male threaded blind insert. Neither EP-A-0595041 nor EP-A-0945631 show, however, the threaded insert being used in a blind rivet that is capable of supporting a shear load, since there is clearance between the pulling mandrel diameter and the bore of the insert. This clearance allows the rivet body to tilt being unsupported internally.

The blind rivet of the present invention offers several advantages. The blind rivet is of large diameter thus providing improved shear resistance and a large bearing area against applied loads. The blind rivet is constructed with a body similar to a threaded insert product that is readily available and an easily produced pulling mandrel. Thus the rivet can be produced on readily available manufacturing machines. This invention, thus, avoids the use of much larger and slower cold forging machines which would have been necessary if a large diameter rivet of a conventional design had been adopted. The blind rivet body is provided with a grooved body that will give it a wider grip capability than the standard type of threaded insert. The pulling mandrel is provided with a shouldered portion that, being in direct contact with the collapsing bore of the rivet body, supports the body against applied shear forces unlike conventional mandrels that are uniform in diameter. The blind rivet can be fully sealed from ingress of moisture or vapours through the centre of the product which is a distinct advantage over usual male threaded inserts.

BRIEF DESCRIPTION OF THE DRAWINGS

The invention is further described and explained by the following description, to be read in conjunction with the appended drawings, in which.

DETAILED DESCRIPTION

Referring together to the attached Figures, the rivet shown comprises a mandrel 1 that is assembled to a threaded insert or rivet body 2 by screwing the threaded portion 6 of the mandrel into the rivet body 2 where it is staked or swaged such that it becomes an integral part of the rivet body.

Figure 2:
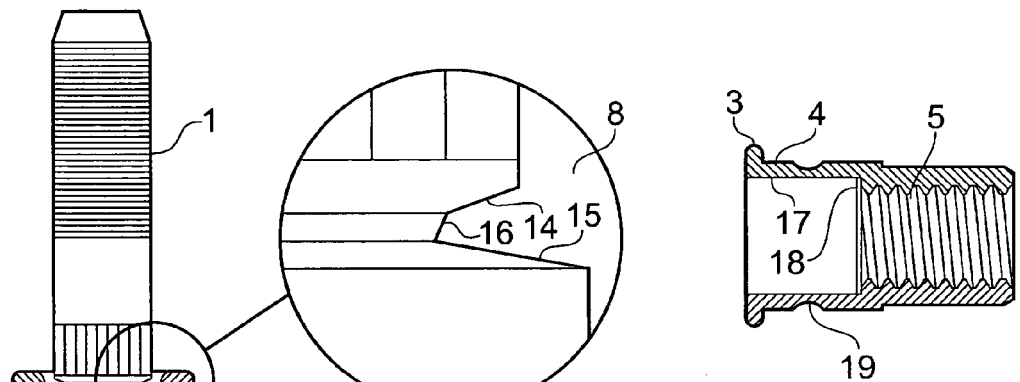
FIG. 2 shows a cross section of the rivet body.

Referring to FIG. 2, the rivet body is characterised by a flange 3, a thin walled collapsing portion 4 and an internally threaded portion 5. The internal bore of the rivet body 17, which determines the collapsing portion, meets the threaded portion in a shoulder 18. Rivet bodies of this type have only a small grip range typically about 1-1.5 mm so in order to improve this range a radial groove 19 is formed in the rivet body midway between the underside of the flange and the internal shoulder 18.

Figure 1:
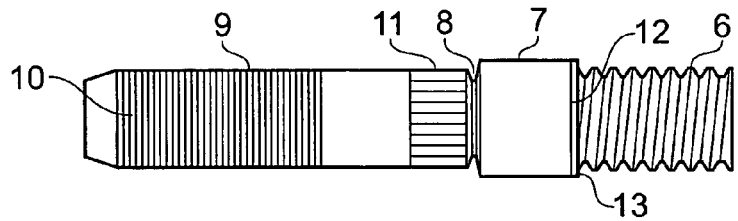
FIG. 1 shows a side view of the mandrel, according to preferred embodiment of the present invention.

Referring to FIG. 1 the mandrel 1 is shown with a male threaded portion 6, an enlarged diameter portion 7, a breaker groove 8 and a tail or pulling portion 9 that is smaller in diameter than the enlarged diameter portion 7. The mandrel also has pulling grooves 10 and longitudinal splines 11 that are an aid to manufacturing and a shoulder 12 which is for location of the sealing ring 13. This sealing ring may be in the form of an 'O' ring, a flat washer or a mechanically dispensed or molded bead.

Figure 3:
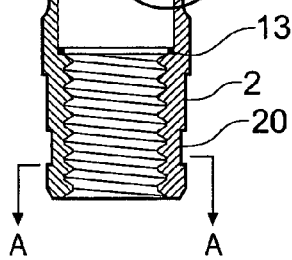
FIG. 3 shows the mandrel of FIG. 1 screwed into the rivet body of FIG. 2.
Figure 4:
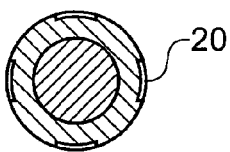
FIG. 4 shows a transverse cross sectional view of FIG. 3, taken along the line A-A, and shows the indents for holding the sealing ring.

The breaker groove 8 is shown in detail in FIG. 3 with tapering sides 14 and 15 and a root 16 that is tapered inwardly towards the threaded end of the mandrel. This inward taper is to encourage the mandrel to break in a plane normal to the axis of the mandrel and not in a ragged fashion that can occur if the root were parallel to the axis. The rivet is assembled by screwing the mandrel 1 into the thread 5 of the rivet body 2 such that the seal 13 abuts tightly against the internal shoulder 18. The mandrel 1 is secured in the threaded portion 5 of the rivet body 2 by swaging or indenting as shown by the four equi-spaced indents 20, shown in FIG. 4. The number of indentations can vary between two and (say) eight.

In use the rivet is assembled into a blind rivet setting tool in the normal manner such that the rivet assembly is entered into the prepared holes 21 in the application plates 22 and 23. By initiating the operating system of the tool the rivet draws the application plates together and secures the joint just prior to the mandrel stem breaking. The spent portion of the mandrel 24 is discarded into the mandrel collection system of the tool.

It can be seen that by locating the flange 3 of the rivet against the nosepiece of the setting tool and pulling the mandrel 1 so that the threaded portion 5 of the rivet body 2 is drawn towards the flange the reduced section 4 of the rivet body will first collapse laterally as the groove 19 progressively folds thus shortening the body 2. The rivet body 2 will then collapse radially on the blind side of the application to form the blind-side bulge 25. The joint is then consolidated as the setting load increases to a point at which the mandrel 1 breaks at the breaker groove 8 at a predetermined break load.

As an added feature, the mandrel male threaded portion 6 can be unscrewed from the female threaded portion 5, if a repair is necessary due to failure of the mandrel to break, and a new mandrel screwed in to the female threaded portion 5 for the riveting operation to be completed.

Figure 5:
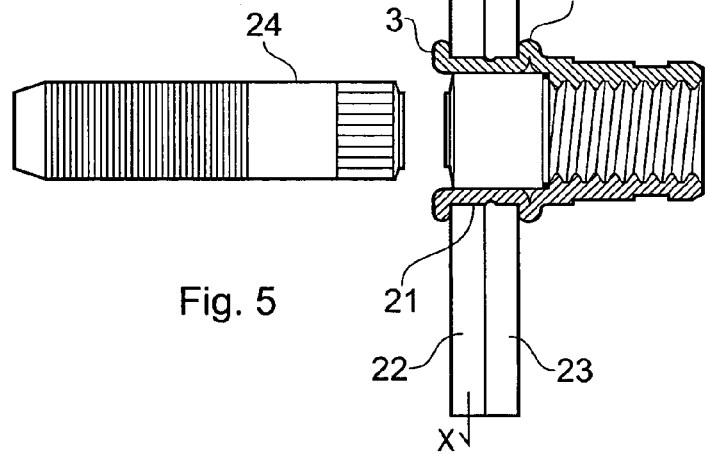
FIG. 5 shows a cross sectional view of the rivet assembly, at completion of insertion, with the pulling portion of the mandrel breaking away.

As an added feature, if, after successful riveting, as illustrated in FIG. 5, a screwed object is to be supported by the rivet, the screw threaded male portion 6 of the mandrel can be unscrewed from the female threaded portion 5 of the rivet body to permit its replacement with a similar screw thread supporting the object to be sustained by the blind rivet. A blind rivet can thereby be used to create secure screw threaded anchoring holes. FIG. 5 also illustrates how shear forces—indicated in the direction of arrowheads X—act on separate sheets 22 and 23 of the workpiece. These shear forces now act on the internal insert and not on the rivet walls due to the minimal clearance between the insert and internal wall of the rivet.

The invention offers particular advantages in the construction of items which may experience shear forces in adjacent sheets of material that make up its walls, such as freight containers. The walls of freight containers—of the type that are transported on large container ships and road haulage vehicles—are subjected to substantial shear forces, for example when the vehicle corners, and the invention resists these forces.

The invention has been described by way of example only and it will be appreciated that variation may be made to the embodiments described without departing form the scope of the invention.

What is claimed is:

1. A blind rivet assembly comprising:
   a rivet body having a flange and a bore, the body comprising a thin walled collapsing portion, and an internal female threaded portion, and
   a mandrel having a male threaded portion, a pulling portion and a breaker groove, the breaker groove having a first portion tapered in a direction towards the male threaded portion and terminating in a second portion also tapered in the direction of the male threaded portion and having a different taper slope from that of the first portion;
   whereby, in use, the male threaded portion is screwed into the female threaded portion to permit the mandrel to pull the female threaded portion towards the flange thereby deforming the collapsing portion and, when the collapsing portion is collapsed, to permit breaking of the pulling portion at the breaker groove.

2. A blind rivet assembly, according to claim 1, wherein said mandrel further comprises a portion of enlarged diameter having a diameter greater than that of the male threaded portion, between said male threaded portion and said breaker groove, and wherein said rivet body further comprises an internal bore to accommodate said portion of enlarged diameter.

3. A blind rivet assembly, according to claim 2, wherein said pulling portion is of smaller diameter than said portion of enlarged diameter.

4. A blind rivet assembly, according to claim 1, wherein said collapsing portion comprises a radial groove on the outer surface thereof to control and improve the radially outward extent of collapse of the collapsing portion.

5. A blind rivet assembly, according to claim 1, wherein said pulling portion comprises pulling grooves.

6. A blind rivet assembly, according to claim 1, wherein said pulling portion comprises longitudinal splines.

7. A blind rivet assembly comprising:
   a rivet body having a flange and a bore, the body comprising a thin walled collapsing portion, and an internal female threaded portion, and
   a mandrel having a male threaded portion, a pulling portion and a breaker groove;
   wherein said mandrel further comprises a portion of enlarged diameter having a diameter greater than that of the male threaded portion, between said male threaded portion and said breaker groove, and wherein said rivet body further comprises an internal bore to accommodate said portion of enlarged diameter;
   wherein said internal bore comprises a shoulder between said internal bore and said internal female threaded portion, said assembly further comprising a sealing ring, operative, when said male threaded portion is screwed into said internal female threaded portion, to provide a seal between said portion of enlarged diameter and said internal female threaded portion;

whereby, in use, the male threaded portion is screwed into the female threaded portion to permit the mandrel to pull the female threaded portion towards the flange thereby deforming the collapsing portion and, when the collapsing portion is collapsed, to permit breaking of the pulling portion, at the breaker groove.

8. A blind rivet assembly, according to claim 7, wherein said sealing ring is one of: an "O" ring, a flat washer, and a mechanically dispensed or molded bead.

* * * * *